Feb. 15, 1966 R. S. McLEAN 3,235,268
SAFETY SPREADER
Filed Dec. 4, 1963 3 Sheets-Sheet 1
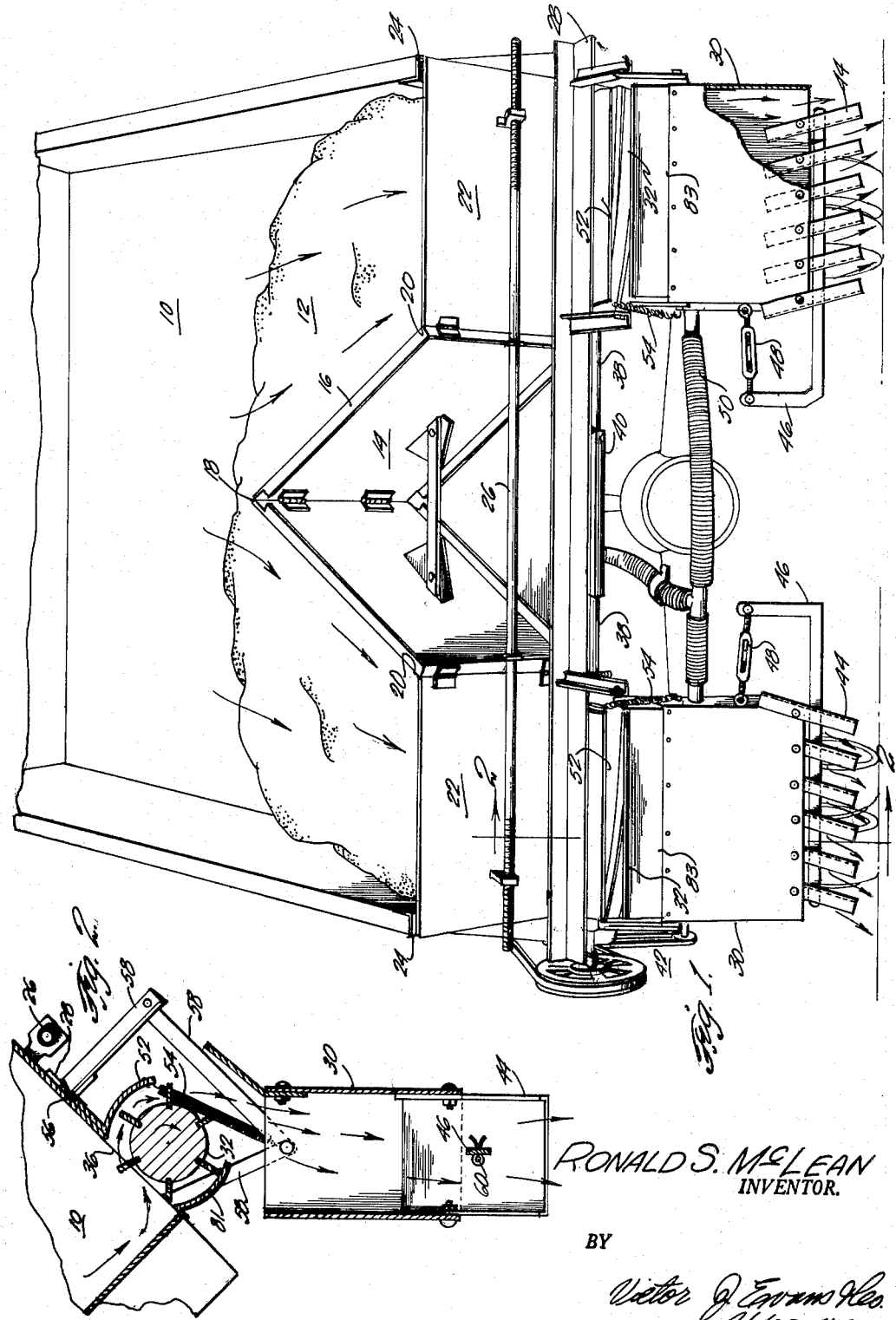
RONALD S. McLEAN
INVENTOR.
BY
Victor J. Evans & Co.
Attorneys Feb. 15, 1966   R. S. McLEAN   3,235,268
SAFETY SPREADER
Filed Dec. 4, 1963   3 Sheets-Sheet 2
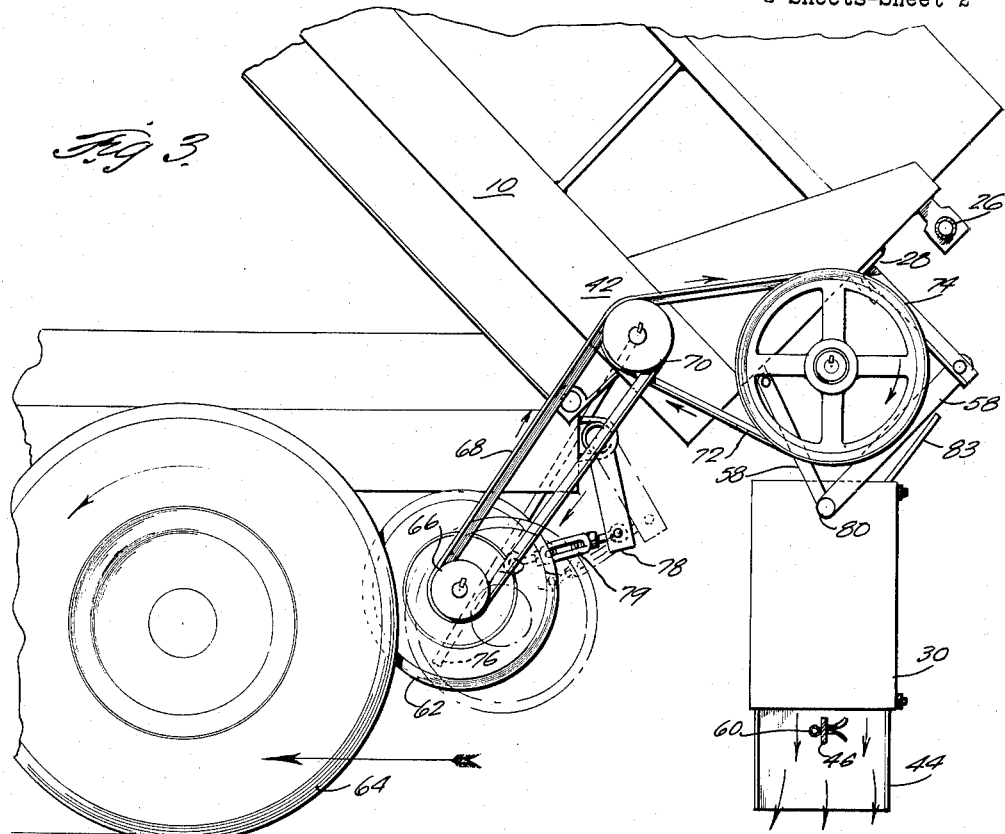
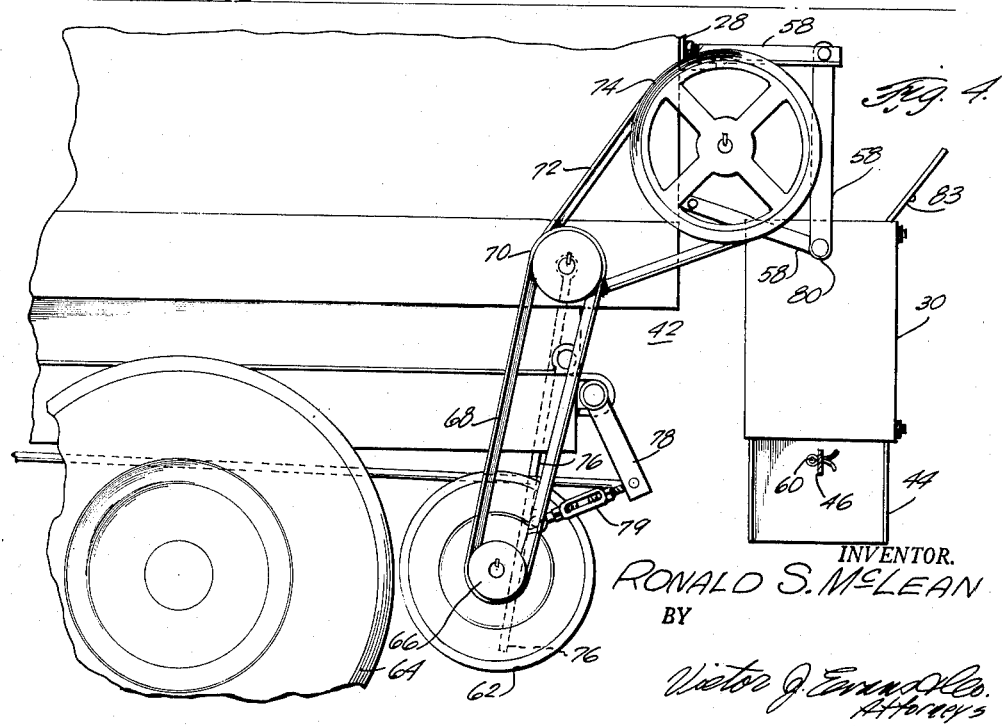
INVENTOR.
RONALD S. McLEAN
BY
Victor J. Evans & Co.
Attorneys

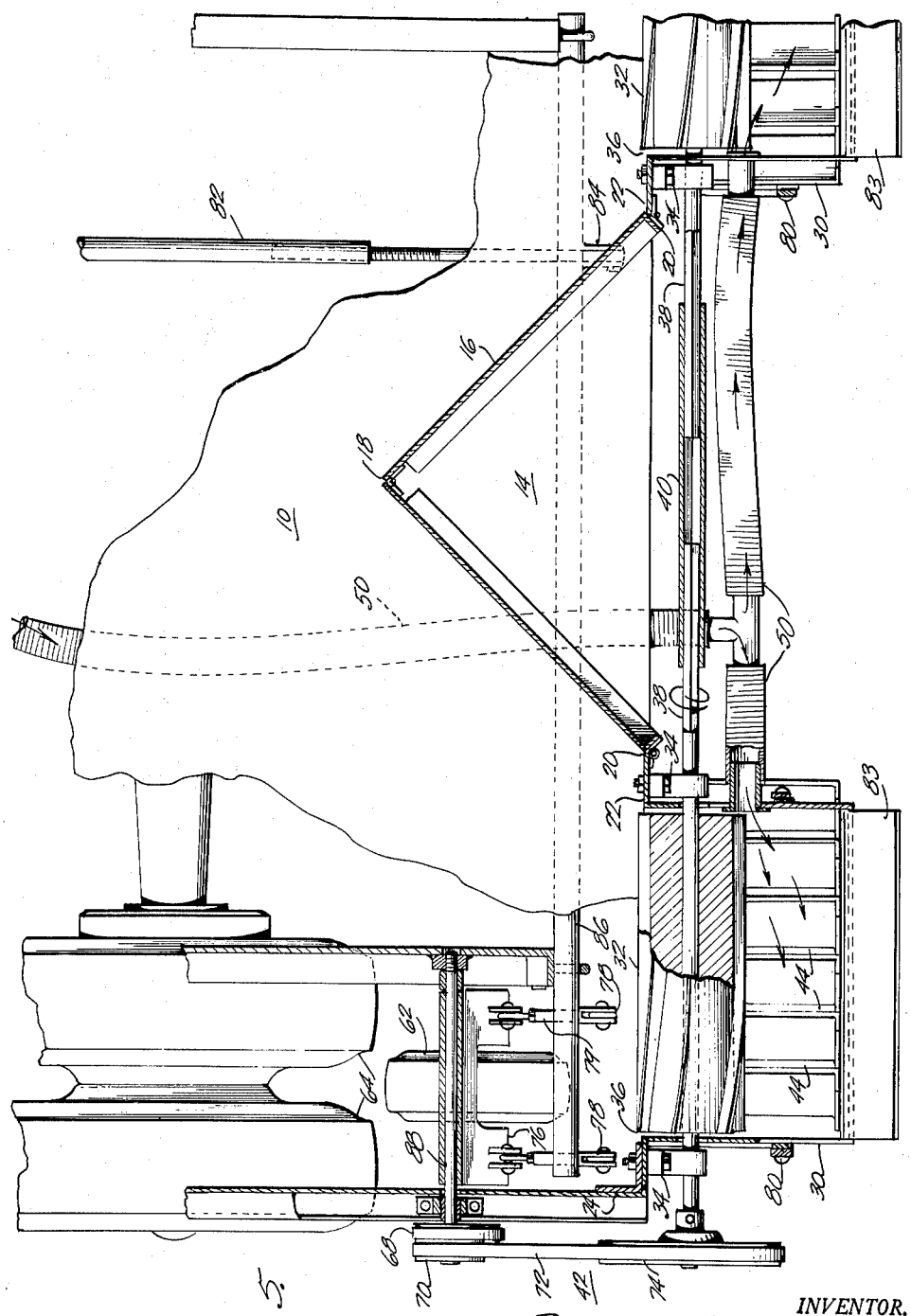

United States Patent Office 3,235,268
Patented Feb. 15, 1966

3,235,268
SAFETY SPREADER
Ronald S. McLean, Ranchester, Wyo.
Filed Dec. 4, 1963, Ser. No. 327,956
10 Claims. (Cl. 275—2)

This invention relates generally to spreading devices and more particularly to an adjustable spreading attachment for the bed of a dump truck.

Spreaders for distributing sand, cinders, and other non-skid materials for icy and snow packed roads have in the past been adaptable only to specific sizes of truck bodies and beds. That is, those structures constructed for one size of truck bed have not had any adjustment features for adaptation to beds of other sizes. This structure is, of course, desirable in many instances, but cannot be found in prior spreader attachments. Furthermore, the structure of these prior devices did not allow for any adjustment in the width of the spread upon the road. The various widths of a spread is first of all necessary if the device is adjustable to various sizes of truck beds. Secondly, a variation in the width of spread is desirable for different situations encountered and for different areas to be covered with the spread. In addition, prior spreading devices did not provide for the elimination of snow and ice, nor the freezing of the materials in the hoppers. Such structures are necessary for the continuous operation of spreading attachments and without such provisions it was necessary for an operator of the dump truck to stop occasionally to clear the hoppers of snow, ice, and frozen materials. In addition to these deficiencies, in structure, prior articles for spreading materials on road involved complex structures.

It is, therefore, a primary object of this invention to provide a safety spreader attachment for the bed of a dump truck which will be adjustable to various sizes of truck beds.

It is another object of the present invention to provide a spreader attachment for dump trucks which allows for various desired widths of the spread.

Another object of the present invention is to provide a spreader attachment for the bed of the dump truck which includes structure for eliminating the snow, ice, and freezing material in the hoppers.

Still another object of this invention is to provide a spreader attachment for the bed of a dump truck which is simple in construction, operation, and handling.

These and other objects will be more fully realized from the novel structure of the present invention which includes in combination an end gate having an adjustable V-shaped portion, a pair of feed cylinders disposed for receiving aggregate material through slots in the end gate, a pair of hoppers disposed below the feed cylinders, and a plurality of adjustable deflectors. The feed cylinders are driven through a pulley and a belt train associated with a power takeoff wheel. Novel structure is included for removing snow and ice and for thawing frozen materials in the hoppers.

The invention, however, will be more fully realized and understood from the following detailed description when taken in conjunction with the accompanying drawings in which like reference numerals designate the same structures and wherein:

FIGURE 1 is an end view of a dump truck bed with the novel structure of the present invention attached thereto;

FIGURE 2 is a sectional view taken along lines 2—2 of FIGURE 1 illustrating the flow of materials from the truck bed through the feed cylinders in the hoppers;

FIGURE 3 is a side view of the invention shown in FIGURE 1 illustrating the novel structure thereof in operation;

FIGURE 4 is a side view illustrating the structure in non-operative position; and FIGURE 5 is a top view shown in partial broken section illustrating the control members for engaging the apparatus for operation from the cab of the truck.

With reference to FIGURE 1, there is shown a dump bed 10 in raised position and having material 12 disposed therein for spreading on a road. End gate 14 includes a V-shaped portion 16 hinged at an apex 18 thereof and at ends 20 thereof to a pair of end portions 22. The V-shaped portion by virtue of the hinged apex and end portions allows for adjustment in the length of the tail gate for adaptation thereof to various sizes of truck beds. Also, this V-shaped portion provides a funneling action to the material 12 for feeding to the spreading structure. A pair of angles 24 are secured at respective ends of the tail gate for fastening thereof to bed 10. An adjusting rod 26 is threadedly secured to each end portion for providing adjustment therebetween. As rod 26 is turned in one direction, end portions 22 are pulled together and the V-shaped portion narrows, and as it is turned in the opposite direction, the ends portions are moved apart from one another and the V-shaped portion widens. An angle 28 is secured to bed 10 adjacent the end gate and is disposed for carrying a pair of hoppers 30 in pivotal relationship thereto. A pair of feed cylinders 32 supported by bearings 34 are in communicating relationship with material 12 through slots 36 in each end portion of the end gate (see FIGURES 2 and 5). Feed cylinders 32 are connected together by means of square rods 38 and a square tube 40. This arrangement allows further for the adjustment of the apparatus, since rods 38 are free to slide within tube 40. The drive for one of cylinders 32 is effected through rods 38 and tube 40 from the other cylinder. Therefore, as end portions 22 are adjusted with respect to one another, the feed cylinders may also adjust with respect to one another by virtue of the sliding engagement of rods 38 and tube 40 without any loss of power drive connection therebetween.

Feed cylinders 32 are driven through a pulley and belt arrangement 42 as will be better seen from the remaining figures. Hoppers 30 include a plurality of deflectors 44 which are disposed for pivotal movement therein. An adjusting bar 46 connects each of the deflector plates of each hopper together and is secured at one end thereof to the side of hopper 30 by means of a turnbuckle 48. Adjustment of the angular position of deflector plates 44 is, therefore, effected by turning buckle 48 one direction or the other. It can be seen that a large variation in the width of the spread on the road is effected by this adjustment feature.

Flexible tubing 50 is connected between the exhaust system of the truck and each hopper providing exhaust gases therein. The heat of the exhaust gases maintains the hoppers at a sufficient temperature to melt all snow and ice which might accumulate therein.

Disposed above each feed cylinder is a hood 52 pivotally secured to each end portion 22 for providing passage of larger objects found in the material 12 while affording protection to the cylinders. Springs 54 provide a bias on hoods 52 in a direction toward the feed cylinders and maintain the flow of material at a predetermined level.

FIGURE 2 is a sectional view taken along lines 2—2 of FIGURE 1 illustrating feed cylinder 32 in communication with hole 36 in each end portion of the end gate. As shown, hood 52 is pivotally secured at a point 56 and angle 28 pivotally supports hopper 30 by means of arms 58 at a point 80. This type of structure allows hoppers 30 to remain in a spreading position at all times. That is, hoppers 30 will tend to remain in the same position with respect to the ground regardless of any elevational variation of the truck bed. Because of the adjacent relationship of cylinders 32 and hoppers 30, the elevation of the truck bed will not effect the flow of materials therebetween. Bar 46 is shown as passing through deflectors 44 and secured thereto by means of cotterpin 60. The arrows shown in FIGURE 2 indicate the direction of flow of material 12 through opening 36, cylinder 32, and hopper 30.

FIGURE 3 illustrates the position of the apparatus in operation. Pulley and belt train 42 is connected between the feed cylinders and a power take-off wheel 62. Train 42 includes a pulley 66 in direct rotational engagement with wheel 62, belt 68, pulley 70, belt 72, and pulley 74 in direct engagement with feed cylinders 30. The power take-off wheel engages truck wheels 64 and drives cylinders 30 through pulley and belt train 42. Wheel 62 is carried by a hanger plate 76 pivotally secured to bed 10 on the shaft of pulley 70. Control lever 78 through adjustable rod 79 effects engagement of power wheel 62 with truck wheels 64. Hopper 30 being pivotally secured to arms 58 at point 80 tends to position itself in a downward direction regardless of the position of bed 10 or the position of the power take-off wheel. That is, regardless of the position of any of the other elements, hopper 30 will remain in the same position with respect to ground. FIGURE 4 illustrates further the position of pulley train 42 in an inoperative position. The power take-off wheel, hanger, control lever, and adjusting rod are also shown in an inoperative position corresponding to the dotted line outline thereof in FIGURE 3. A comparison of FIGURES 3 and 4 illustrates the relative position of hoppers 30 at two extreme positions of bed 10. A bottom shield 81 disposed below cylinders 32 and attached to bed 10 (shown in FIGURE 2) restricts material 12 from falling between bed 10 and hopper 30. In the position of bed 10 shown in FIGURE 4, shield 81 extends to the upper edge of hopper 30. Another shield 83 is also provided on hoppers 30 for restricting and funneling the flow of the material.

As shown in FIGURE 5, power take-off wheel 62 is in position for movement to engage with truck wheels 64. A control rod 82 is connected by means of a lever 84 to a bar 86. Levers 78 are likewise connected to bar 86 for controlling the position of hanger 76 when rod 82 is actuated in one axial direction or the other. Hanger 76 is shown as being pivotally mounted on the shaft of pulley 70 (designated by reference numeral 88) thus eliminating any stretching of belts 68 and 72. Therefore, the power take-off wheel may be moved into and out of engagement with the truck wheels without placing any strain on the pulley and belt train.

The sectional illustration in FIGURE 5 of the drive connection linkage between the feed cylinders shows more clearly the sliding adjustable engagement therein. That is, as the V-shaped portion is widened for a wider truck bed, adjacent ends of rods 38 move apart, but remain in driving engagement by the interaction therebetween of square tube 40 and vice versa.

The principles of the invention explained in connection with the specific exemplification thereon will suggest many other applications and modifications of the same. It is accordingly desired that, in construing the breadth of the appended claims, they shall not be limited to the specific details shown and described in connection with the exemplification thereof.

What is claimed is:

1. A spreader for attachment to the bed of a dump truck comprising an end gate having a V-shaped portion and a pair of end portions each secured to a respective end of the V-shaped portion, a pair of elongated feed cylinders each rotatably mounted from a respective end portion, a pair of hoppers secured to said end gate in spaced relationship to said cylinders, each of said hoppers including a plurality of deflector plates, the end portions of said end gate each including a slot for providing communication between the truck bed and a respective one of said cylinders, and means for rotating said cylinders, each of said cylinders having a pivotally supported hood for permitting passage of large objects 2. A spreader as in claim 1 wherein said means for rotating the cylinders includes a power take-off wheel and a pulley and belt train connected between the cylinders and the power take-off wheel.

3. A spreader as in claim 2 including a hanger pivotally secured to the bed of a truck at one end thereof, and to said take-off wheel at the other end thereof, and means connected to said hanger for placing the take-off wheel in frictional engagement with a wheel of the truck.

4. A spreader as in claim 3 wherein said means for placing includes a control rod disposed in operating position within a cab of the truck.

5. A spreader as in claim 1 wherein said means for rotating said cylinders includes an adjustable linkage connected between the cylinders.

6. A spreader as in claim 5 wherein said means for rotating the cylinders includes a power take-off wheel disposed for frictional engagement with a wheel of the truck and a pulley and belt train connected between one of the cylinders and said power take-off wheel.

7. A spreader as in claim 6 wherein said V-shaped portion is adjustable in the width between the sides thereof.

8. A spreader as in claim 7 including heat conducting means connected between an exhaust of the truck and said hoppers.

9. A spreader as in claim 8 wherein said deflector plates are pivotally mounted within an end of said hoppers and including means for providing rotational displacement of said deflector plates therein.

10. A heated spreader for attachment to the bed of a dump truck comprising an end gate for the dump truck, a pair of elongated feed cylinders rotatably mounted from the end of the dump truck, a pair of hoppers secured to the end gate in spaced relationship to the cylinders, each of said hoppers including a plurality of deflector plates, the end portions of said end gate each including a slot for providing communication between the truck bed and a respective one of said cylinders, means for rotating said cylinders and each of said cylinders having a pivotally supported hood for permitting passage of large objects, and a heat-conducting means for imparting heat to said material and large objects, and connected between the exhaust of the truck and said hoppers.

References Cited by the Examiner

UNITED STATES PATENTS

| 659,158 | 10/1900 | Schlabach | 275—2 |
|---|---|---|---|
| 693,695 | 2/1902 | Faulk | 275—2 |
| 1,182,747 | 5/1916 | Brown | 275—2 |
| 1,606,676 | 11/1926 | Urann | 275—2 |
| 1,644,575 | 10/1927 | Fitzgerald | 275—14 |
| 2,093,953 | 9/1937 | Burchott | 275—14 |
| 2,244,987 | 6/1941 | Faulkner | 275—2 |
| 2,935,139 | 5/1960 | Dede | 172—60 |

ABRAHAM G. STONE, *Primary Examiner.*

WILLIAM A. SMITH III, *Examiner.*